Aug. 7, 1934.  W. J. MACK  1,969,087
LOCKING KEY FOR CAR BRAKES
Filed Aug. 7, 1931

Witness:
J. J. Oberst.

William J. Mack, Inventor.
By Emil Neukart
Attorney.

Patented Aug. 7, 1934

1,969,087

UNITED STATES PATENT OFFICE 1,969,087

LOCKING KEY FOR CAR BRAKES

William J. Mack, Buffalo, N. Y.

Application August 7, 1931, Serial No. 555,680

8 Claims. (Cl. 188—243)

This invention relates to improvements in railway-car brakes, and more particularly to keys for locking brake shoes to brake heads.

One of the objects of my invention is the production of a key which can be used with any standard brake shoe and head, so classified by the Master Car Builders Association, and one which will effectively and securely fasten shoes to brake heads without play between the two, even though one or both are worn; also without possibility of the keys falling out in the event that the car to which they are applied is inverted, thus preventing the brake shoes from dropping from the brake heads.

Another object of my invention is the provision of a locking key for brake shoes which possesses the quality of drawing the brake shoe in firm contact with the brake head regardless of the wear on either or both and which is so constructed that it will automatically take up the wear of either or both.

With the above and other objects in view, the invention consists of the means, the novel features of construction, and in the arrangement and combination of parts to be hereinafter described and more particularly pointed out in the appended claims.

Figure 1:
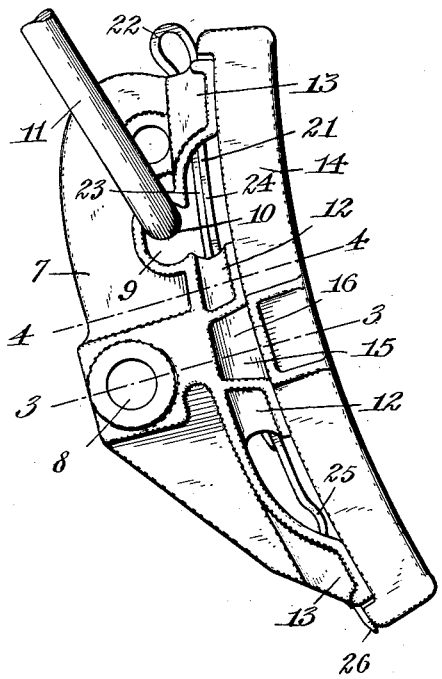
Fig. 1 is a side elevation of a standard brake head and brake shoe applied thereto by means of my improved locking key.
Figure 2:
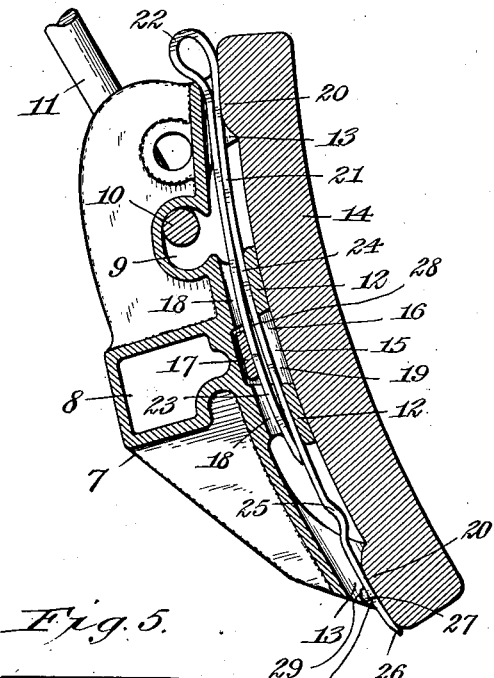
Fig. 2 is a central vertical section through a brake head and shoe, showing my improved key in side elevation and in position to firmly lock the brake shoe to the brake head.
Figure 3:
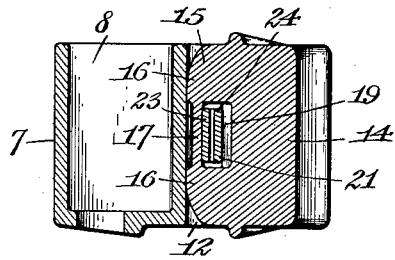
Fig. 3 is a cross section taken on line 3—3, Fig. 1.
Figure 4:
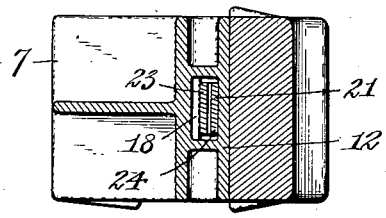
Fig. 4 is a cross section taken on line 4—4, Fig. 1.
Figure 5:
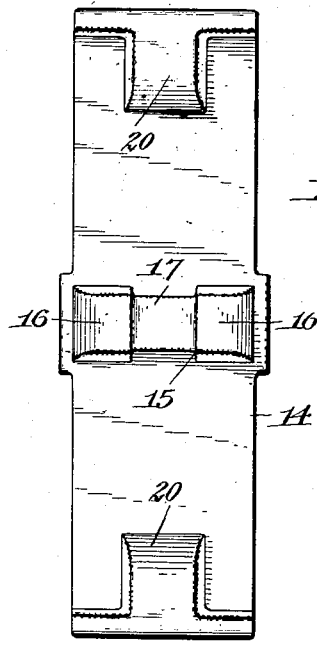
Fig. 5 is an inner-face view of a standard brake shoe.
Figure 6:
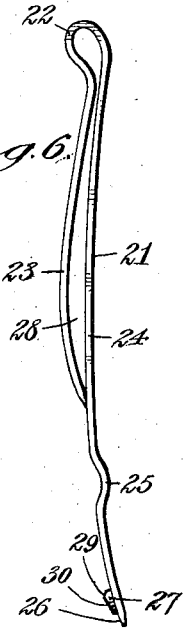
Fig. 6 is a side elevation of my improved locking key.

In railway brake constructions, as now commonly used, brake shoes are removably applied to brake heads supported from the truck or under-frame of a car by means of hangers; brake-beams being also employed and each provided with two brake-heads alined with axle-connected wheels of the car. A well known form of hanger is shown in the drawing, and it comprises a U-shaped link or element, the transverse or bight member of which is passed through a transverse opening or recess in the brake head and is retained in said opening or recess by the brake shoe and the key employed to secure or lock the shoe to the head; all of which is standard as railway-car equipment. My improved locking key is designed for use in connection with any of the various makes of brake appliances possessing such features.

Reference being now had to the drawing in detail, the numeral 7 designates the brake head, provided with a transverse opening 8 to receive the brake-beam (not shown). This opening, as shown, is somewhat rectangular, but may be otherwise shaped, since the cross-sectional formation of brake-beams are varied by different manufacturers. Brake heads of different manufacture do not vary in any essentials or in size; and while varying slightly in shape, all are provided with hanger openings or recesses, such as shown at 9, for the reception of the cross member 10 of a hanger 11.

Centrally between its ends, the brake head is provided with connector lugs 12 which are spaced apart vertically and their opposing faces beveled inwardly. Other lugs 13 extend outwardly from the brake head at the top and bottom, and these are spaced apart transversely at each end of the head.

The brake shoe 14 has a retainer element 15, comprising two transversely-spaced connector lugs 16 connected by a strap or bar 17, which in itself is spaced from the inner convex face of the brake shoe, forming in effect a loop adapted to fit into the space between the lugs 12 on the brake head. The transversely-spaced connector lugs 16 of the brake shoe are tapered or beveled inwardly at the top and bottom so as to conform to the beveled opposing faces of the connector lugs 12 on the brake head. In a broader sense, the lugs 16 and the strap or bar 17 may be considered a single connector lug having an opening therethrough.

The connector lugs 12 are provided with openings 18, which are in the same vertical plane and are intended to register or partly register with the space 19 between the convex surface of the brake shoe and the opposing surface of the strap or bar 17. The lugs 13 at each end of the brake head are adapted to receive between them lugs 20 arranged at the top and bottom of the brake shoe.

The description thus far relates to one manufacture of brake appliance approved by the Master Car Builders Association. My improved locking key is adapted for connecting or locking brake shoes to brake heads of this general type, although in many instances slight variations in form may exist.

My improved locking key, designated 21, like all keys employed for connecting brake shoes to brake heads, is inserted between the top and bottom lugs 20 of the brake head, passed through the openings 18 in the connector lugs arranged on the concaved face of the brake head between its ends and through the space between the connector lugs 16 on the brake shoe.

The locking key is formed of a flat resilient strip of metal curved upon itself at a point between its ends to provide a loop 22 and two members 23, 24, member 23 being somewhat shorter than member 24, and both members being curved lengthwise. Member 24 is provided with a stop, in the form of a hump 25, between its extremity and the extremity of member 23, the hump extending from the concave side of member 24. In order to assist in the introduction of the key, the extremity of member 24 is tapered, as at 26, above which taper it is provided with a stop stud or projection 27. Member 23 is fashioned with a greater curve than member 24 so as to provide a space 28 between the two members.

The curvature of member 24 approximates that of the curvature of the outer face of the brake head and the inner face of the brake shoe, while the curvature of member 23 is such as to convert said member into a spring arm capable of being forced under pressure into a position more closely approaching member 24.

When applying the key in position to secure or lock the brake shoe to the brake head, it is introduced between the two from the upper end of the brake shoe; the free end of member 24 being inserted between the lugs 13 of the brake head. The key is thrust downwardly under hand pressure through the opening 18 in the upper of the intermediate or connector lugs 12, thence through the connector lug of the brake shoe between the inner convex surface thereof and the opposing face of the strap or bar 17, and finally through the opening 18 in the lower of the intermediate or connector lugs 12 of the brake head.

As the hump 25 of member 23 of the key comes in contact with the outer wall of the upper connecting lug 12 on the brake head, it may offer slight resistance to the further downward movement of the key, making it necessary to use extra force in moving the key downwardly, and this slight resistance may again be encountered as the hump 25 comes in contact with the outer wall of the lower lug 12 on said brake head; and when the lower end of member 23 of said key comes in contact with the strap or bar 17 of the connector lug on the brake shoe, it will offer sufficient resistance to the further downward movement of the key to make it necessary to resort to the use of a hammer or other suitable tool to drive the key into position. This will cause member 23 to flex and assume a curvature very closely approaching that of member 24 while riding downwardly in contact with the strap or bar 17. The downward movement of the key under force thus exerted will result in the extremity of the key coming in contact with the inner surface of the bottom lug 20 on the brake shoe, while the member 23 of the key extends downwardly through the opening in the lower of the pair of intermediate lugs 12 on the brake head.

This locking key is so constructed that it will, with equal effectiveness, secure or lock worn brake shoes to new brake heads, new brake shoes to worn brake heads, worn brake shoes to worn brake heads, or new brake shoes to new brake heads, without possibility of play existing between the two. It will effectively permit the use of brake shoes and brake heads, or either of them, already worn and generally considered beyond use, since the inherent resiliency of member 23 of the locking key is of such capacity as to firmly draw the connector lugs of the brake shoe into the space provided for them between the connector lugs on the brake head, with absolute assurance of firm contact of the engaging surfaces of said lugs and elimination of all play.

It is now common to deliver carloads of material, such as coal and the like, by completely inverting the car with its supporting platform. This results in the upper ends of the brake shoes and brake heads being temporarily positioned at the bottom, and in many cases where brake shoes or brake heads are worn, locking keys now employed will, under such conditions, drop out of position and this results in the brake shoes becoming disconnected from the brake heads. With my improved locking key, the loss of brake shoes under such conditions is impossible, even under the most severe conditions of wear of the brake shoes or brake heads, owing to the fact that in withdrawing the locking key from locking position, the stop hump 25 below the extremity of member 23 will come in contact with the lower edge of the lower connector lug 12 on the brake head and movement of the key beyond such point cannot take place without exerting considerable force against the lower end of the key to cause flexing of member 23 sufficiently to enable the offset 25 to be forced upwardly beyond said lug; and even after the hump 25 is moved upwardly free of said lug, the contact of the opposite faces of the key with opposing surfaces of the brake head and brake shoe will cause the stud 27 to engage the inner side of the strap or bar 17. Thus it will be found that not only is the inherent resiliency of the curved member 23 depended upon to prevent accidental displacement of the lock key, but this is also prevented by the stop hump 25 and the stud 27 on member 24.

The stud is preferably beveled upwardly and downwardly, as at 29, 30, respectively, the bevel 29 being a short bevel wholly above the axis of said stud, while the bevel 30 is a comparatively long bevel which extends from a plane above the axis of the stud downwardly beneath the axis of the stud and to the lowest point thereof.

It is, of course, understood that by reason of the short bevel 29 being wholly above the axis of said stud, such bevel will, under proper force, ride over the lower edge of the strap or bar 17 and permit complete removal of the locking key.

It is also to be understood that the long bevel 30 of the stud 27, which extends downwardly beneath the axis of the stud, will permit of driving the stud beyond the strap or bar 17, in the event of its coming in contact with the latter when inserting the key; also that when the key is inserted, the loop 22, formed at the top of the key by curving the strap or bar from which it is formed upon itself, will prevent downward movement beyond that intended for the same.

It is to be understood that under the inherent resiliency of the short member 23 of my improved locking key, the wear caused between the brake head and the brake shoe, and particularly on the connector lugs, will be automatically taken up, and consequently regardless of the length of use of the brake shoe and brake head, assurance is had of a tight application of the brake shoe to the brake head under all conditions of use; such connection being maintained until either the brake shoe or brake head or both are completely worn out. The lugs on the brake head and brake shoe are invariably referred to as connector lugs, while those at the upper and lower ends of the brake heads or brake shoes serve more particularly as guide lugs and are sometimes otherwise referred to.

Having thus described my invention, what I claim is:

1. A key for connecting brake shoes to brake heads formed of a flat strip of resilient metal bent upon itself between its ends to form a loop, a long member and a short member, said members being curved lengthwise and the short member being of greater curvature than the long member and having its extremity in contact with said long member, said long member being provided with a stop hump in spaced relation to the extremity of said short member and said short member being adapted to move in closer relation to said long member throughout its length when inserted through the lugs of a brake shoe and head.

2. A key for connecting brake shoes to brake heads formed of a flat strip of resilient metal bent upon itself between its ends to form a loop, a long member and a short member, said members being curved lengthwise and the short member being of greater curvature than the long member and having its extremity in contact with said long member, said long member having a hump between its extremity and the extremity of said short member.

3. A key for connecting brake shoes to brake heads formed of a flat strip of resilient metal bent between its ends to form a loop, a long member and a short member, said members being curved lengthwise along substantially their full lengths and the shorter of said members being of greater curvature than the other to provide a space between the two, one of said members being provided with a hump on its concaved surface spaced from the lower extremity of the key.

4. A key for connecting brake shoes to brake heads, comprising two members connected together at corresponding ends, one of said members being longer than the other and both being curved lengthwise, the short member being of greater curvature than the long member and having its extremity in contact with said long member, said long member being provided with a stop hump projecting from its concaved surface in spaced relation to the extremity of said short member.

5. A key for connecting brake shoes to brake heads formed of a flat strip of resilient metal bent between its ends to provide a long member and a short member, said members being curved lengthwise and the short member being of greater curvature than the long member, said long member having a stud between its extremity and the extremity of said short member, and said stud beveled upwardly from a plane above its axis and downwardly from said plane to its lowest point.

6. A key for connecting brake shoes to brake heads formed of a flat strip of resilient metal bent between its ends to form a long member and a short member, said members being curved lengthwise and the short member being of greater curvature than the long member and having its extremity in contact with said long member, said long member being provided with a stop on its concaved side between its extremity and the extremity of said short member.

7. A key for connecting brake shoes to brake heads formed of a flat strip of resilient metal bent between its ends to form a long member and a short member, said members being curved lengthwise and the short member being of greater curvature than the long member, said long member being provided with a stop on its convex side adjacent its extremity.

8. A key for connecting brake shoes to brake heads formed of a flat strip of resilient metal bent between its ends to form a long member and a short member, said members being curved lengthwise and the short member being of greater curvature than the long member, said long member being bulged outwardly on its concaved side to form a hump.

WILLIAM J. MACK.